(12) United States Patent
Nakil et al.

(10) Patent No.: US 8,750,288 B2
(45) Date of Patent: Jun. 10, 2014

(54) PHYSICAL PATH DETERMINATION FOR VIRTUAL NETWORK PACKET FLOWS

(71) Applicant: Juniper Networks, Inc., Sunnyvale, CA (US)

(72) Inventors: Harshad Bhaskar Nakil, San Jose, CA (US); Ankur Singla, Belmont, CA (US); Rajashekar Reddy, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 13/843,500

(22) Filed: Mar. 15, 2013

(65) Prior Publication Data

US 2013/0332602 A1    Dec. 12, 2013

Related U.S. Application Data

(60) Provisional application No. 61/729,474, filed on Nov. 23, 2012, provisional application No. 61/723,684, filed on Nov. 7, 2012, provisional application No. 61/723,685, filed on Nov. 7, 2012, provisional application No. 61/722,696, filed on Nov. 5, 2012, provisional application No. 61/721,979, filed on Nov. 2, 2012, provisional application No. 61/721,994, filed on Nov. 2, 2012, provisional application No. 61/718,633, filed on Oct. 25, 2012, provisional application No. 61/656,468, filed on Jun. 6, 2012, provisional application No. 61/656,469, filed on Jun. 6, 2012, provisional application No. 61/656,471, filed on Jun. 6, 2012.

(51) Int. Cl.
*H04L 12/28* (2006.01)
*G06F 15/173* (2006.01)

(52) U.S. Cl.
USPC .................... 370/351; 370/389; 709/224

(58) Field of Classification Search
CPC combination set(s) only.
See application file for complete search history.

(56) References Cited

U.S. PATENT DOCUMENTS

| | | | |
|---|---|---|---|
| 6,760,328 | B1 | 7/2004 | Ofek |
| 6,781,959 | B1 * | 8/2004 | Garakani et al. .............. 370/242 |
| 7,042,838 | B1 | 5/2006 | Shand et al. |
| 7,184,437 | B1 | 2/2007 | Cole et al. |
| 7,519,006 | B1 | 4/2009 | Wing |

(Continued)

OTHER PUBLICATIONS

Hopps, "Analysis of an Equal-Cost Multi-Path Algorithm," Network Working Group, RFC 2992, Nov. 2000, 8 pp.

(Continued)

*Primary Examiner* — Clemence Han
(74) *Attorney, Agent, or Firm* — Shumaker & Sieffert, P.A.

(57) ABSTRACT

In general, techniques are described for determining a physical network path taken by packets of a network packet flow. The techniques may be applied to determine, or "trace," a physical network path in the virtualized network domain. In some examples, a network device includes one or more processors and a switch executed by the processors to forward packets of a packet flow to a physical network path. The network device also includes a flow trace module to generate one or more flow trace packets having incrementally increasing respective time-to-live (TTL) values, wherein the switch module forwards the flow trace packets on an outbound interface of the network device for the physical network path, and wherein the flow trace module receives corresponding time exceeded messages for the flow trace packets, wherein each of the time exceeded message includes a source network address of a network element on the physical network path.

21 Claims, 9 Drawing Sheets

(56) References Cited

U.S. PATENT DOCUMENTS

| | | | |
|---|---|---|---|
| 7,937,492 B1 | 5/2011 | Kompella et al. | |
| 8,254,273 B2* | 8/2012 | Kaminsky et al. | 370/248 |
| 2007/0195797 A1 | 8/2007 | Patel et al. | |
| 2010/0061242 A1 | 3/2010 | Sindhu et al. | |
| 2011/0317696 A1* | 12/2011 | Aldrin et al. | 370/390 |

OTHER PUBLICATIONS

Invitation to Pay Additional Fees from International Application No. PCT/US2013/044378, dated Sep. 18, 2013, 5 pp.

Notification of Transmittal of the International Search Report from International Application No. PCT/US2013/044378, dated Nov. 7, 2013, 16 pp.

\* cited by examiner

PHYSICAL PATH DETERMINATION FOR VIRTUAL NETWORK PACKET FLOWS

PRIORITY CLAIM

This application claims the benefit of U.S. Provisional Application No. 61/729,474, filed Nov. 23, 2012; U.S. Provisional Application No. 61/723,684, filed Nov. 7, 2012; U.S. Provisional Application No. 61/723,685, filed Nov. 7, 2012; U.S. Provisional Application No. 61/722,696, filed Nov. 5, 2012; U.S. Provisional Application No. 61/721,979, filed Nov. 2, 2012; U.S. Provisional Application No. 61/721,994, filed Nov. 2, 2012; U.S. Provisional Application No. 61/718,633, filed Oct. 25, 2012; U.S. Provisional Application No. 61/656,468, filed Jun. 6, 2012; U.S. Provisional Application No. 61/656,469, filed Jun. 6, 2012; and U.S. Provisional Application No. 61/656,471, filed Jun. 6, 2012; the entire content of each of which being incorporated herein by reference.

TECHNICAL FIELD

The invention relates to computer networks and more particularly to virtual networks.

BACKGROUND

In a typical cloud data center environment, there is a large collection of interconnected servers that provide computing and/or storage capacity to run various applications. For example, a data center may comprise a facility that hosts applications and services for subscribers, i.e., customers of data center. The data center may, for example, host all of the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

SUMMARY

In general, techniques are described for determining a physical network path taken by packets of a network packet flow. The techniques may be applied to determine, or "trace," a physical network path in the virtualized network domain. In a virtualized or overlay network environment, the edge of the network extends from a physical network element (e.g., a switch or a router) to software switches (i.e., virtual switches) each executed by a hypervisor or a host operating system of a physical server. In such an environment, physical servers may execute application instances that communicate by exchanging layer three (L3 or "network") packets using a virtual network that is implemented by one or more software switches and that is orthogonal from the physical network and the corresponding physical addressing scheme. Virtual network elements (which include both the virtual switches and physical network elements) encapsulate packets generated or consumed by instances of the application in the virtual network domain in a tunnel header that includes addresses that conform to the physical network addressing scheme. Accordingly, and hereinafter, a packet generated or consumed by application instances may be referred to as an in "inner packet," while the physical network packet that includes the inner packet encapsulated within the added tunnel header may be referred to as an "outer packet." The tunnel header allows the physical network to tunnel the inner packet toward a destination virtual switch for delivery to a destination application instance. In some cases, the tunnel header may include sub-headers for multiple layers, such as a transport layer (e.g., Transmission Control Protocol (TCP) or User Datagram Protocol (UDP) header), network layer, and/or tunneling layer.

In some examples, a virtual network element receives a request to determine a physical network path taken by packets of a network packet flow. For a packet that corresponds to a particular packet flow, the virtual network element generates a first flow trace packet that has one or more tunnel header fields identical to packets of the packet flow. As a result, the first flow trace packet will traverse a physical network path identical to packets of the packet flow. To determine a first next hop along the physical network path taken by the packet flow, the virtual network element sets a time-to-live (TTL) value for the flow trace packet to 1, then forwards the first flow trace packet to the first next hop according to the virtual network element network forwarding table. Because the TTL value for the first flow trace packet is set to 1, the first next hop discards the first flow trace packet and returns a Time Exceeded message for the first flow trace packet, such as an Internet Control Message Protocol (ICMP) Time Exceeded message. The time exceeded message includes a network address of the first next hop. The virtual network element iterates TTL values on successive flow trace packets, otherwise similar to the first flow trace packet, and forwards the successive flow trace packets according to the virtual network element forwarding table. Successive next hops along the physical path for the packet flow therefore each receives a flow trace packet with TTL value set to 1 and each returns a time exceeded message. The virtual network element can use the returned time exceeded messages returned from physical next hops along the physical path to generate a list of the physical next hops, which the virtual network element can return to a device that has requested the physical network path.

Because the flow trace packet is a trace packet and may not include application data for an application, the virtual network element may in some instances add a special flow trace packet indicator to a field of the tunnel header of flow trace packets. A tunnel termination virtual network element, or "tunnel endpoint," ordinarily decapsulates received outer packets of the tunneled packet flow to remove the outer header and forwards the resulting inner packet toward an application. The flow trace packet indicator indicates to the tunnel endpoint that a received packet is a flow trace packet and should be discarded rather than forwarded. The tunnel endpoint therefore identifies packet flow packets that include the flow trace packet indicator and discards the packet. In some instances, the tunnel endpoint may have previously received an antecedent flow trace packet for the packet flow for which the tunnel endpoint returned a time exceeded message to the issuing virtual network element. In some examples, the tunnel endpoint may return an ICMP Echo Reply message or other confirmation message upon receiving a flow trace packet to the issuing virtual network element in order to confirm receipt of the flow trace packet at the termination of the tunnel.

The techniques described herein may provide one or more advantages. For example, the techniques may allow for determination of a physical network path for a packet flow traversing a virtualized network domain. Determining a physical network path for a packet flow using the described techniques may also overcome certain limitations of the network trace route utility conventionally used to determine a physical network path. In some cases, multiple paths of equal cost exist between a virtual network element and a destination. The virtual network element may allocate packet flows having the same source and destination to different equal-cost paths according to the particularities of packet flow packet headers. In contrast to the trace route utility, which may produce ICMP echo request messages that form a packet flow allocated by a virtual network element to a different one of the multiple paths, the techniques may ensure that the path taken by the flow trace packets matches the physical network path taken by a corresponding packet flow in a multi-path environment.

In one aspect, a method for determining a physical network path of a packet flow includes generating, with a network device, one or more flow trace packets having incrementally increasing respective time-to-live (TTL) values. The method also includes sending, with the network device, the flow trace packets on an outbound interface of the network device for the physical network path. The method further includes receiving, with the network device, corresponding time exceeded messages for the flow trace packets, wherein each of the time exceeded message includes a source network address of a network element on the physical network path.

In another aspect, a network device includes one or more processors and a switch executed by the processors to forward packets of a packet flow to a physical network path. The network device also includes a flow trace module to generate one or more flow trace packets having incrementally increasing respective time-to-live (TTL) values, wherein the switch module forwards the flow trace packets on an outbound interface of the network device for the physical network path, wherein the flow trace module receives corresponding time exceeded messages for the flow trace packets, and wherein each of the time exceeded message includes a source network address of a network element on the physical network path.

In another aspect, a non-transitory computer-readable medium contains instructions. The instructions cause one or more programmable processors to generate, with a network device, one or more flow trace packets having incrementally increasing respective time-to-live (TTL) values. The instructions further cause the programmable processors to send, with the network device, the flow trace packets on an outbound interface of the network device for the physical network path. The instructions further cause the programmable processors to receive, with the network device, corresponding time exceeded messages for the flow trace packets, wherein each of the time exceeded message includes a source network address of a network element on a physical network path. The instructions also cause the programmable processors to determine, with the network device, the physical network path using the source network addresses of the time exceeded message.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference characters denote like elements throughout the figures and text.

DETAILED DESCRIPTION

Figure 1:
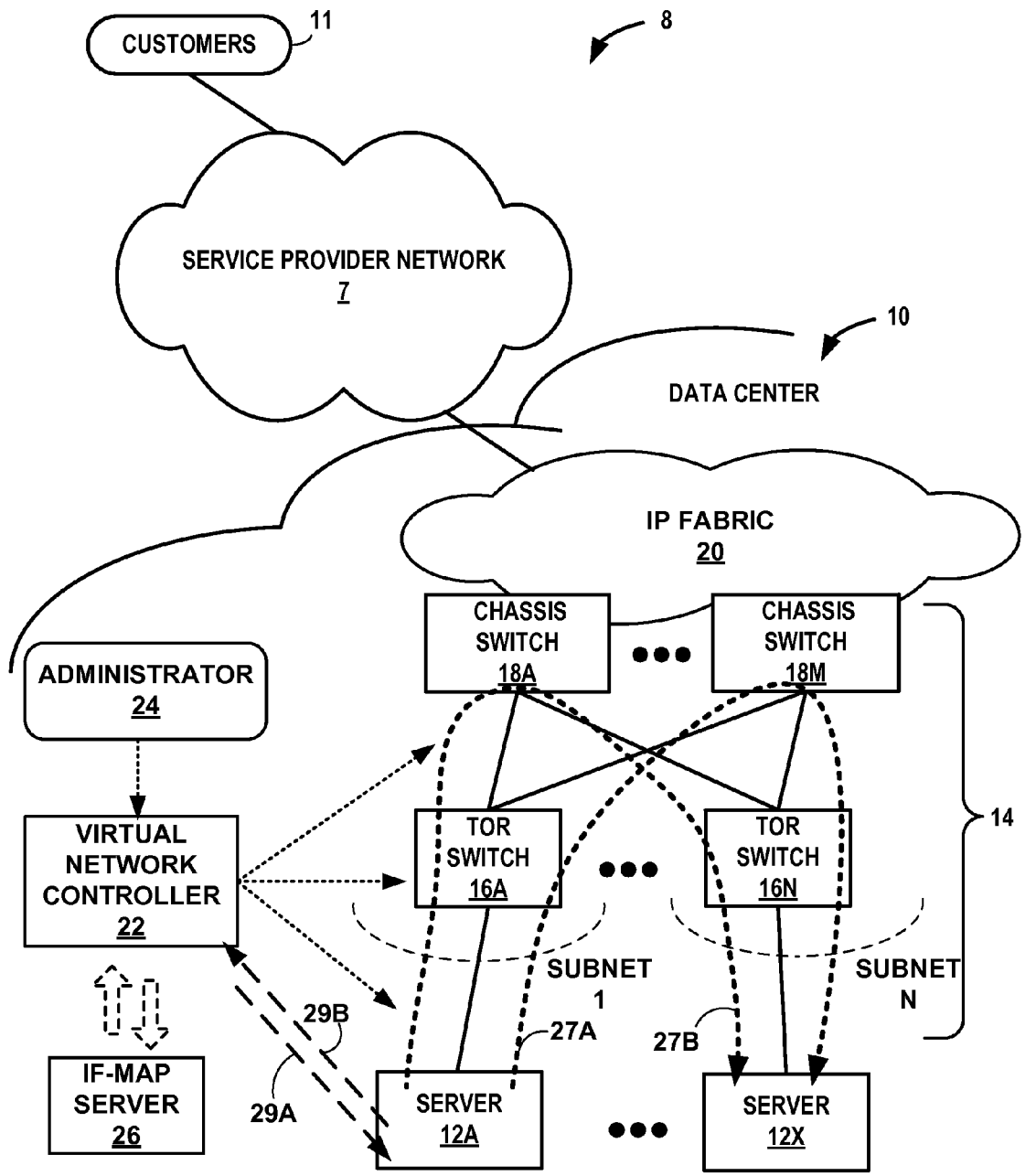
FIG. 1 is a block diagram illustrating an example network having a data center in which examples of the techniques described herein may be implemented.

FIG. 1 is a block diagram illustrating an example network 8 having a data center 10 in which examples of the techniques described herein may be implemented. In general, data center 10 provides an operating environment for applications and services for customers 11 coupled to the data center by service provider network 7. Data center 10 may, for example, host infrastructure equipment, such as networking and storage systems, redundant power supplies, and environmental controls. Service provider network 7 may be coupled to one or more networks administered by other providers, and may thus form part of a large-scale public network infrastructure, e.g., the Internet.

In some examples, data center 10 may represent one of many geographically distributed network data centers. As illustrated in the example of FIG. 1, data center 10 may be a facility that provides network services for customers 11. Customers 11 may be collective entities such as enterprises and governments or individuals. For example, a network data center may host web services for several enterprises and end users. Other exemplary services may include data storage, virtual private networks, traffic engineering, file service, data mining, scientific- or super-computing, and so on. In some embodiments, data center 10 may be individual network servers, network peers, or otherwise.

In this example, data center 10 includes a set of storage systems and application servers 12A-12X (herein, "servers 12") interconnected via high-speed switch fabric 14 provided by one or more tiers of physical network switches and routers. Switch fabric 14 is provided by a set of interconnected top-of-rack (TOR) switches 16A-16BN (collectively, "TOR switches 16") coupled to a distribution layer of chassis switches 18A-18M (collectively, "chassis switches 18"). Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In this example, TOR switches 16 and chassis switches 18 provide servers 12 with redundant (multi-homed) connectivity to IP fabric 20 and service provider network 7. Chassis switches 18 aggregate traffic flows and provides high-speed connectivity between TOR switches 16. TOR switches 16 may be network devices that provide layer 2 (MAC) and/or layer 3 (e.g., IP) routing and/or switching functionality. TOR switches 16 and chassis switches 18 may each include one or more processors and a memory, and that are capable of executing one or more software processes. Chassis switches 18 are coupled to IP fabric 20, which performs layer 3 routing to route network traffic between data center 10 and customers 11 by service provider network 7.

Virtual network controller 22 ("VNC") provides a logically and in some cases physically centralized controller for facilitating operation of one or more virtual networks within data center 10 in accordance with one or more embodiments of this disclosure. In some examples, virtual network controller 22 may operate in response to configuration input received from network administrator 24.

Typically, the traffic between any two network devices, such as between network devices within IP fabric 20 (not shown) or between servers 12 and customers 11 or between servers 12, for example, can traverse the physical network using many different paths. For example, there may be several different paths of equal cost between two network devices. In some cases, packets belonging to network traffic from one network device to the other may be distributed among the various possible paths using a routing strategy called multi-path routing at each network switch node. For example, the Internet Engineering Task Force (IETF) RFC 2992, "Analysis of an Equal-Cost Multi-Path Algorithm," describes a routing technique for routing packets along multiple paths of equal cost. The techniques of RFC 2992 analyzes one particular multipath routing strategy involving the assignment of flows to bins by hashing packet header fields that sends all packets from a particular network flow over a single deterministic path.

For example, a "flow" can be defined by the five values used in a header to a packet, or "five-tuple," i.e., the protocol, Source IP address, Destination IP address, Source port and Destination port that are used to route packets through the physical network. For example, the protocol specifies the communications protocol, such as TCP or UDP, and Source port and Destination port refer to source and destination ports of the connection. A set of one or more packet data units (PDUs) that match a particular flow entry represent a flow. Flows may be broadly classified using any parameter of a PDU, such as source and destination MAC and IP addresses, a Virtual Local Area Network (VLAN) tag, transport layer information, a Multiprotocol Label Switching (MPLS) or Generalized MPLS (GMPLS) label, and an ingress port of a network device receiving the flow. For example, a flow may be all PDUs transmitted in a Transmission Control Protocol (TCP) connection, all PDUs sourced by a particular MAC address or IP address, all PDUs having the same VLAN tag, or all PDUs received at the same switch port.

Each individual switch router in the network may perform its own independent hashing computation to determine the path that will be used by a particular flow. The ECMP paths between the first and second network devices may be viewed by the virtual network as one physical connection, as their packet (inner packet) is encapsulated by an outer IP header.

In the example of FIG. 1, multiple paths 27A-27B (collectively, "path 27") of equal routing cost exist from server 12A to server 12X. Path 27B traverses a physical network path proceeding from server 12A and consisting of TOR switch 16A, chassis switch 18A, TOR switch 16N, and server 12X. Path 27A, by contrast, traverses a physical network path proceeding from server 12A and consisting of TOR switch 16A, chassis switch 18M, TOR switch 16N, and server 12X. Server 12A may allocate packet flows, generated by applications executing on server 12A (not shown in FIG. 1), to any of paths 27 according to an allocation scheme. The allocation scheme may allocate packets according to an invariant selection of the packet header fields, including source IP address, destination IP address, IP protocol (IPv4) or next header (IPv6), transport layer source port, and/or transport layer destination port, for example. Invariant is used to refer to packet fields that do not change among packets belonging to a packet flow. Packets belonging to a packet flow allocated to path 27A, for example, traverse path 27A to reach server 12X.

In accordance with techniques described in this disclosure, server 12A may receive a request 29A to determine a physical network path traversed by packets of a particular packet flow that server 12A has allocated to path 27A. Server 12A generates a first flow trace packet that has at least the packet header fields identical to packets of the requested packet flow sufficient to cause server 12A to match the first flow trace packet to the packet flow according to the allocation scheme and thereby cause the first flow trace packet to be forwarded according to path 27A. As a result, the first flow trace packet will traverse a physical network path identical to packets of the packet flow.

To determine a first next hop along the physical network path taken by the packet flow, server 12A sets a time-to-live (TTL) value for the flow trace packet to 1, then forwards the first flow trace packet to the first next hop of path 27A, i.e., TOR switch 16A. Because the TTL value for the first flow trace packet is set to 1, TOR switch 16A decrements the TTL value to zero, discards the first flow trace packet, and returns an Internet Control Message Protocol (ICMP) Time Exceeded message for the first flow trace packet, which includes a network address of TOR switch 16A. Although described as an ICMP Time Exceeded Message, the time exceeded message may include another type of message that indicates TOR switch 16A has received an IP packet having TTL value=1.

Server 12A generates a second flow trace packet, otherwise similar to the first flow trace packet, but increments the TTL value to set the TTL value on the second flow trace packet to 2. Server 12A forwards the second flow trace packet along path 27A. Chassis switch 18M receives the second flow trace packet, discards the packet, and responsively returns an ICMP Time Exceeded message to server 12A. Server 12A iteratively generates additional flow trace packets for the packet flow, incrementing the TTL value with each successive flow trace packet and forwarding the additional flow trace packets along path 27A. As a result, successive next hop along the path 27A each receives, for the packet flow, a flow trace packet with zero TTL and each returns an ICMP Time Exceeded message to server 12A. In contrast to the trace route utility, which if executed by server 12A would produce ICMP echo request messages that form a packet flow that could be allocated by server 12A to path 27B, the techniques may ensure that the path taken by the flow trace packets matches the physical network path taken by a corresponding packet flow, i.e., path 27A in a multi-path environment. Server 12A can use the returned ICMP Time Exceeded messages returned from physical next hops along path 27A to generate a list of the physical next hops, which server 12A returns to VNC 22 in response 29B. In some instances, the techniques described above as being performed by server 12A may instead, or additionally, be performed by elements of switch fabric 14 such as TOR switches 16 and chassis switches 18.

Figure 2:
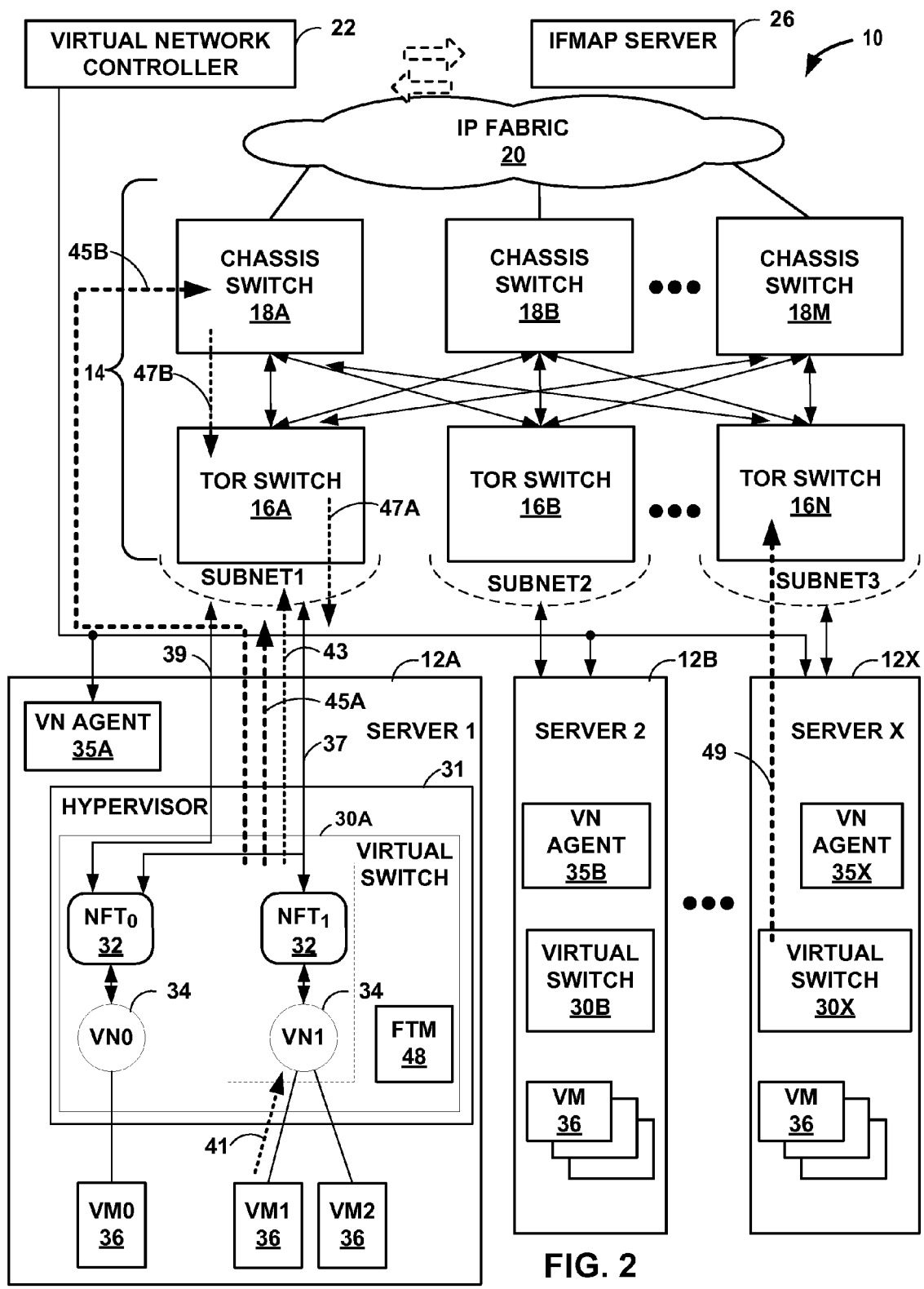
FIG. 2 is a block diagram illustrating an example implementation of the data center of FIG. 1 in further detail.

FIG. 2 is a block diagram illustrating an example implementation of data center 10 of FIG. 1 in further detail. In the example of FIG. 2, data center 10 includes an overlay network that extends switch fabric 14 from physical switches 16, 18 to software or "virtual" switches 30A-30X (collectively, "virtual switches 30"). Virtual switches 30 dynamically create and manage one or more virtual networks 34 usable for communication between application instances. In one example, virtual switches 30 execute the virtual network as an overlay network, which provides the capability to decouple an application's virtual address from a physical address (e.g., IP address) of the one of servers 12A-12X ("servers 12") on which the application is executing. Each virtual network may use its own addressing and security scheme and may be viewed as orthogonal from the physical network and its addressing scheme. Various techniques may be used to transport packets within and across virtual network(s) 34 over the physical network.

Each virtual switch 30 may execute within a hypervisor, a host operating system or other component of each of servers 12. In the example of FIG. 2, virtual switch 30A executes within hypervisor 31, also often referred to as a virtual machine manager (VMM), which provides a virtualization platform that allows multiple operating systems to concurrently run on one of host servers 12. In the example of FIG. 2, virtual switch 30A manages virtual networks 34, each of which provides a network environment for execution of one or more virtual machines (VMs) 36 on top of the virtualization platform provided by hypervisor 31. Each VM 36 is associated with one of the virtual subnets VN0-VN1 managed by the hypervisor 31.

In general, each VM 36 may be any type of software application and may be assigned a virtual address for use within a corresponding virtual network 34, where each of the virtual networks may be a different virtual subnet provided by virtual switch 30A. A VM 36 may be assigned its own virtual layer three (L3) IP address, for example, for sending and receiving communications but may be unaware of an IP address of the physical server 12A on which the virtual machine is executing. In this way, a "virtual address" is an address for an application that differs from the logical address for the underlying, physical computer system, e.g., server 12A in the example of FIG. 2.

In one implementation, each of servers 12 includes a corresponding one of virtual network (VN) agents 35A-35X (collectively, "VN agents 35") that controls the overlay of virtual networks 34 and that coordinates the routing of data packets within server 12. In general, each VN agent 35 communicates with virtual network controller 22, which generates commands to control routing of packets through data center 10. VN agents 35 may operate as a proxy for control plane messages between virtual machines 36 and virtual network controller 22. For example, a VM 36 may request to send a message using its virtual address via the VN agent 35A, and VN agent 35A may in turn send the message and request that a response to the message be received for the virtual address of the VM 36 that originated the first message. In some cases, a VM 36 may invoke a procedure or function call presented by an application programming interface of VN agent 35A, and the VN agent 35A may handle encapsulation of the message as well, including addressing.

In one example, network packets, e.g., layer three (L3) IP packets or layer two (L2) Ethernet packets generated or consumed by the instances of applications executed by virtual machines 36 within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet." Encapsulation and/or de-capsulation of virtual network packets within physical network packets may be performed within virtual switches 30, e.g., within the hypervisor or the host operating system running on each of servers 12. As another example, encapsulation and de-capsulation functions may be performed at the edge of switch fabric 14 at a first-hop TOR switch 16 that is one hop removed from the application instance that originated the packet. This functionality is referred to herein as tunneling and may be used within data center 10 to create one or more overlay networks. Besides IPinIP, other example tunneling protocols that may be used include IP over GRE, VxLAN, MPLS over GRE, etc.

As noted above, virtual network controller 22 provides a logically centralized controller for facilitating operation of one or more virtual networks within data center 10. Virtual network controller 22 may, for example, maintain a routing information base, e.g., one or more routing tables that store routing information for the physical network as well as one or more overlay networks of data center 10. Similarly, switches 16, 18 and virtual switches 30 maintain routing information, such as one or more routing and/or forwarding tables. In one example implementation, virtual switch 30A of hypervisor 31 implements a network forwarding table (NFT) 32 for each virtual network 34. In general, each NFT 32 stores forwarding information for the corresponding virtual network 34 and identifies where data packets are to be forwarded and whether the packets are to be encapsulated in a tunneling protocol, such as with a tunnel header that may include one or more headers for different layers of the virtual network protocol stack.

For example, virtual machine 36 VM1 sends a packet 41, an "inner packet," virtual switch 30A by an internal link. Virtual switch 30A uses $NFT_1$ to look up a virtual network destination network address for packet 41. $NFT_1$ specifies an outbound interface for virtual switch 30A and encapsulation for packet 41. Virtual switch 30A applies the encapsulation to add a tunnel header to generate outer packet 43 and outputs outer packet 43 on the outbound interface, in this case toward TOR switch 16A.

The routing information may, for example, map packet key information (e.g., destination IP information and other select information from packet headers) to one or more specific next hops within the networks provided by virtual switches 30 and switch fabric 14. In some case, the next hops may be chained next hop that specify a set of operations to be performed on each packet when forwarding the packet, such as may be used for flooding next hops and multicast replication. In some cases, virtual network controller 22 maintains the routing information in the form of a radix tree having leaf nodes that represent destinations within the network. U.S. Pat. No. 7,184,437 provides details on an exemplary embodiment of a router that utilizes a radix tree for route resolution, the contents of U.S. Pat. No. 7,184,437 being incorporated herein by reference in its entirety.

As shown in FIG. 2, each virtual network 34 provides a communication framework for encapsulated packet communications 37 for the overlay network established through switch fabric 14. In this way, network packets associated with any of virtual machines 36 may be transported as encapsulated packet communications 37 via the overlay network. In addition, in the example of FIG. 2, each virtual switch 30 includes a default network forwarding table $NFT_0$ and provides a default route that allows a packet to be forwarded to virtual subnet VN0 without encapsulation, i.e., non-encapsulated packet communications 39 per the routing rules of the physical network of data center 10. In this way, subnet VN0 and virtual default network forwarding table $NFT_0$ provide a mechanism for bypassing the overlay network and sending non-encapsulated packet communications 39 to switch fabric 14.

Moreover, virtual network controller 22 and virtual switches 30 may communicate using virtual subnet VN0 in accordance with default network forwarding table $NFT_0$ during discovery and initialization of the overlay network, and during conditions where a failed link has temporarily halted communication via the overlay network. Once connectivity with the virtual network controller 22 is established, the virtual network controller 22 updates its local routing table to take into account new information about any failed links and directs virtual switches 30 to update their local network forwarding tables 32. For example, virtual network controller 22 may output commands to virtual network agents 35 to update one or more NFTs 32 to direct virtual switches 30 to change the tunneling encapsulation so as to re-route communications within the overlay network, for example to avoid a failed link.

When link failure is detected, a virtual network agent 35 local to the failed link (e.g., VN Agent 35A) may immediately change the encapsulation of network packet to redirect traffic within the overlay network and notifies virtual network controller 22 of the routing change. In turn, virtual network controller 22 updates its routing information any may issues messages to other virtual network agents 35 to update local routing information stored by the virtual network agents within network forwarding tables 32.

Virtual switch 30A of server 12A includes flow trace module (FTM) 48 to determine physical network paths traversed by packet flows switched by virtual switch 30A. Flow trace module 48 may be executed by hypervisor 31, by a host operating system of server 12A, or by VM agent 35A of server 12. To trace a physical network path traversed by outer packet 45, flow trace module 48 generates a flow trace packet 45A that includes a tunnel header similar to that of outer packet 43. However, flow trace module 48 initially sets a TTL value of first flow trace packet 45A to 1. In addition, flow trace module 48 may set a special flow trace packet indicator in a field of the tunnel header of flow trace packet 45A and subsequent flow trace packets (e.g., flow trace packet 45B) corresponding to flow trace packet 45A to direct a receiving virtual switch 30 of data center 10 to discard the inner packet of the first flow trace packet if received with a TTL value set greater than 1. Virtual switch 30A outputs flow trace packet 45A on the output interface shared by flow trace packet 45A and outer packet 43. TOR switch 16A that is a first next hop on a physical network path for flow trace packet 45A and outer packet 43 receives flow trace packet 45A, decrements the TTL value to 0 and, because the TTL value is 0, returns an ICMP Time Exceeded message 47A to virtual switch 30A.

ICMP Time Exceeded message 47A may include a Time Exceeded message Code 0 to indicate that TOR switch 16A discarded flow trace packet 45A due to an expired TTL field. ICMP Time Exceeded message 47A is an IP packet that includes an IMCP Time Exceeded message (ICMP Type 11). The IP packet header has a source IP address of TOR switch 16A and a destination IP address that is the source IP address of flow trace packet 45A (e.g., the IP address of virtual machine 36 VM1). The IMCP Time Exceeded message includes the IP header and the first eight bytes of the encapsulated data of flow trace packet 45A.

Flow trace module 48 additionally generates flow trace packet 45B, which is similar to flow trace packet 45A but has a TTL value of 2. Virtual switch 30A outputs flow trace packet 45B on the output interface shared by flow trace packet 45B and outer packet 43. Chassis switch 18A receives flow trace packet 45B with TTL value set to 1, having been TTL value-decremented and forwarded by TOR switch 16A. Chassis switch 18A, like TOR switch 16A with respect to flow trace packet 45A, decrements the TTL value of flow trace packet 45B to 0 and therefore return an ICMP Time Exceeded message 47B to virtual switch 30A. ICMP Time Exceeded message 47B is similar to ICMP Time Exceeded message 47A but has a source IP address that is an IP address of chassis switch 18A.

Flow trace module 48 continues generating flow trace packets in this manner until switch 30A receives a confirmation message 49 that one of the subsequent flow trace packets has arrived at another of virtual switches 30, in this case server 12X. A confirmation message may include, e.g., an ICMP Echo Reply message. In this way, FTM 48 of switch 30A may receive messages, including ICMP Time Exceeded messages 47A, 47B, from each of the physical network elements on a physical network path traversed by outer packet 45. Flow trace module 48 may aggregate IP addresses for each of the physical network elements from the respective received messages into a list, which FTM 48 may send to, e.g., a virtual network controller 22 of data center 10. Flow trace module 48 may in some instances append a virtual IP address for server 12X received in confirmation message 49 to the list. Flow trace module 48 returns the list of IP addresses for the physical network elements to a requesting device, or may provide the list to another component of virtual switch 30A or a host operating system of server 12A, for example.

Figure 3:
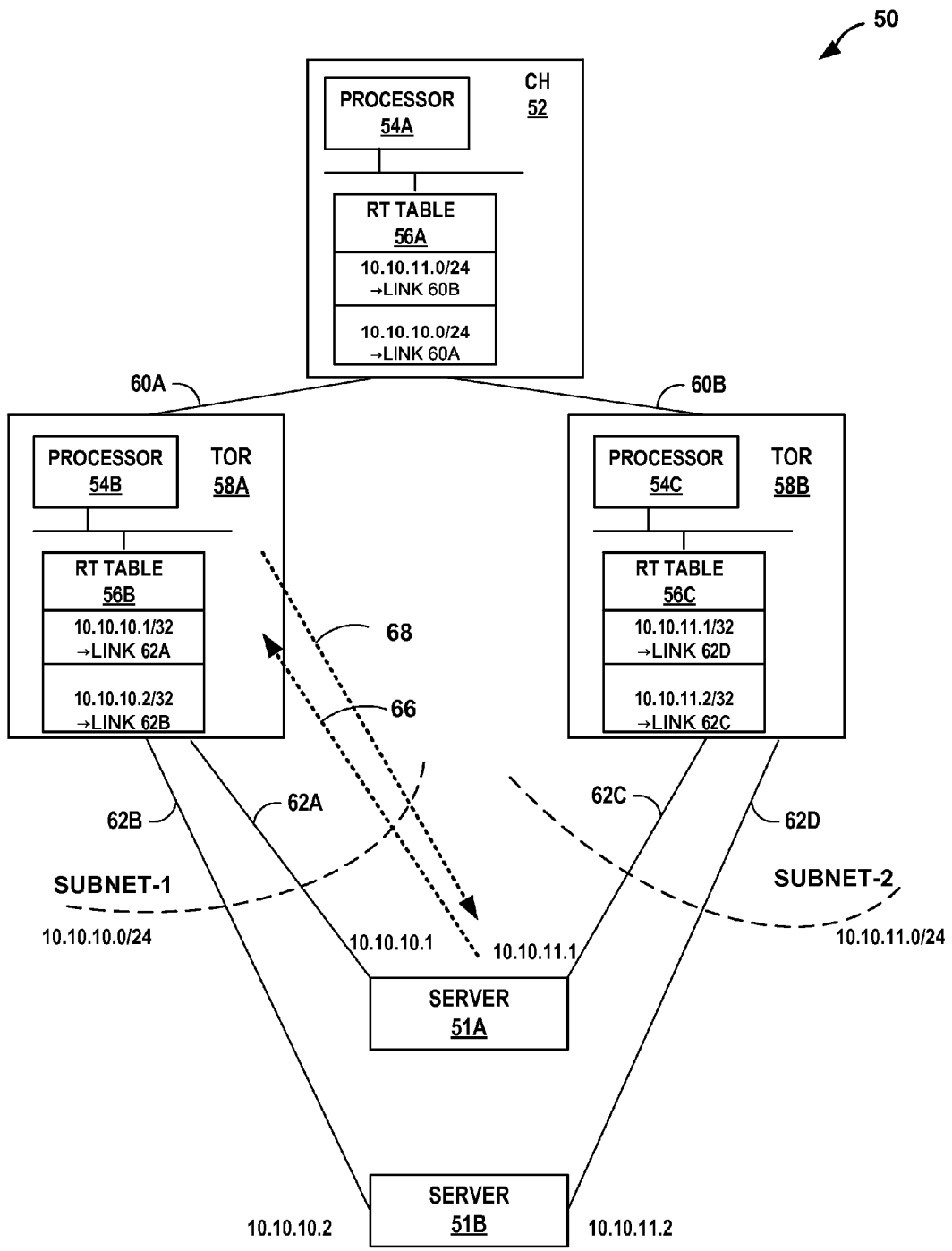
FIG. 3 is another block diagram illustrating an example system illustrating example configuration of routing information within a chassis switch and top-of-rack (TOR) switches as described herein.

FIG. 3 is another block diagram illustrating an example system 50 illustrating example configuration of routing information within a chassis switch and TOR switches as described herein. System 50 of FIG. 3 may, for example, correspond to portions of data center 10 illustrated in FIGS. 1 and 2.

In this example, chassis switch 52 ("CH 52"), which may be any of chassis switches 18 of FIG. 1, is coupled to Top of Rack (TOR) switches 58A-58B ("TORs 58") by chassis link 60A and chassis link 60B, respectively ("chassis links 60"). TORs 58 may, in some examples, be any of TORs 16 of FIG. 1. In the example of FIG. 3, TORs 58 are also coupled to servers 51A-51B ("servers 51") by TOR links 62A-62D ("TOR links 62"). Servers 51 may be any of servers 210 (FIG. 1). Here, servers 51 communicate with both TORs 58, and can physically reside in either associated rack. TORs 58 each communicate with a number of network switches, including chassis switch 52.

Chassis switch 52 has a processor 54A in communication with an interface for communication with a network as shown, as well as a bus that connects a memory (not shown) to processor 54A. The memory may store a number of software modules. These modules include software that controls network routing, such as an OSPF module (not shown) containing instructions for operating the chassis switch 52 in compliance with the OSPF protocol. Chassis switch 52 maintains routing table ("RT table") 56A containing routing information for packets, which describes a topology of a network. Routing table 56A may be, for example, a table of packet destination Internet protocol (IP) addresses and the corresponding next hop, e.g., expressed as a link to a network component. Reference herein to IP may refer to IPv4 or IPv6.

TORs 58 each have a respective processor 54B, 54C, an interface in communication with chassis switch 52, and a memory (not shown). Each memory contains software modules including an OSPF module and routing table 56B, 56C as described above.

TORs 58 and chassis switch 52 may exchange routing information specifying available routes, such as by using a link-state routing protocol such as Open Shortest Path First (OSPF) or IS-IS. TORs 58 may be configured as owners of different routing subnets. For example, TOR 58A is configured as the owner of Subnet 1, which is the subnet 10.10.10.0/24 in the example of FIG. 2, and TOR 58A is configured as the owner of Subnet 2, which is the subnet 10.10.11.0/24 in the example of FIG. 2. As owners of their respective Subnets, TORs 58 locally store the individual routes for their subnets and need not broadcast all route advertisements up to chassis switch 52. Instead, in general TORs 58 will only advertise their subnet addresses to chassis switch 52.

Chassis switch 52 maintains a routing table ("RT table") 56A, which includes routes expressed as subnets reachable by TORs 58, based on route advertisements received from TORs 58. In the example of FIG. 2, RT table 56A stores routes indicating that traffic destined for addresses within the subnet 10.10.11.0/24 can be forwarded on link 60B to TOR 58B, and traffic destined for addresses within the subnet 10.10.10.0/24 can be forwarded on link 60A to TOR 58A.

In typical operation, chassis switch 52 receives Internet Protocol (IP) packets through its network interface, reads the packets' destination IP address, looks up these addresses on routing table 56A to determine the corresponding destination component, and forwards the packets accordingly. For example, if the destination IP address of a received packet is 10.10.10.0, i.e., the address of the subnet of TOR 58A, the routing table of chassis switch 52 indicates that the packet is to be sent to TOR 58A via link 60A, and chassis switch 52 transmits the packet accordingly, ultimately for forwarding to a specific one of the servers 51.

Similarly, each of TORs 58 receives Internet Protocol (IP) packets through its network interface, reads the packets' destination IP address, looks up these addresses on its routing table 56 to determine the corresponding destination component, and forwards the packets according to the result of the lookup. In some cases, a network element (e.g., one of TORs 48 or chassis switch 52) may receive an IP packet having a TTL value of 1. As a result, the network element returns an ICMP Time Exceeded message to the source IP address of the packet. In accordance with techniques described herein, servers 51 may "walk" a physical network path of system 50 by issuing successive flow trace packets with iterated TTL values and receive, in response, ICMP Time Exceeded messages from successive physical network elements along the path.

In one example iteration, server 51A sends flow trace packet 66, an IP packet, having a TTL value set to 1 to TOR 58A. Flow trace packet 66 may represent any of flow trace packets 45 of FIG. 2. TOR 58A receives flow trace packet 66, decrements the TTL value and, because the TTL value is now 0, returns an ICMP Time Exceeded message 68 to server 51A.

Figure 4:
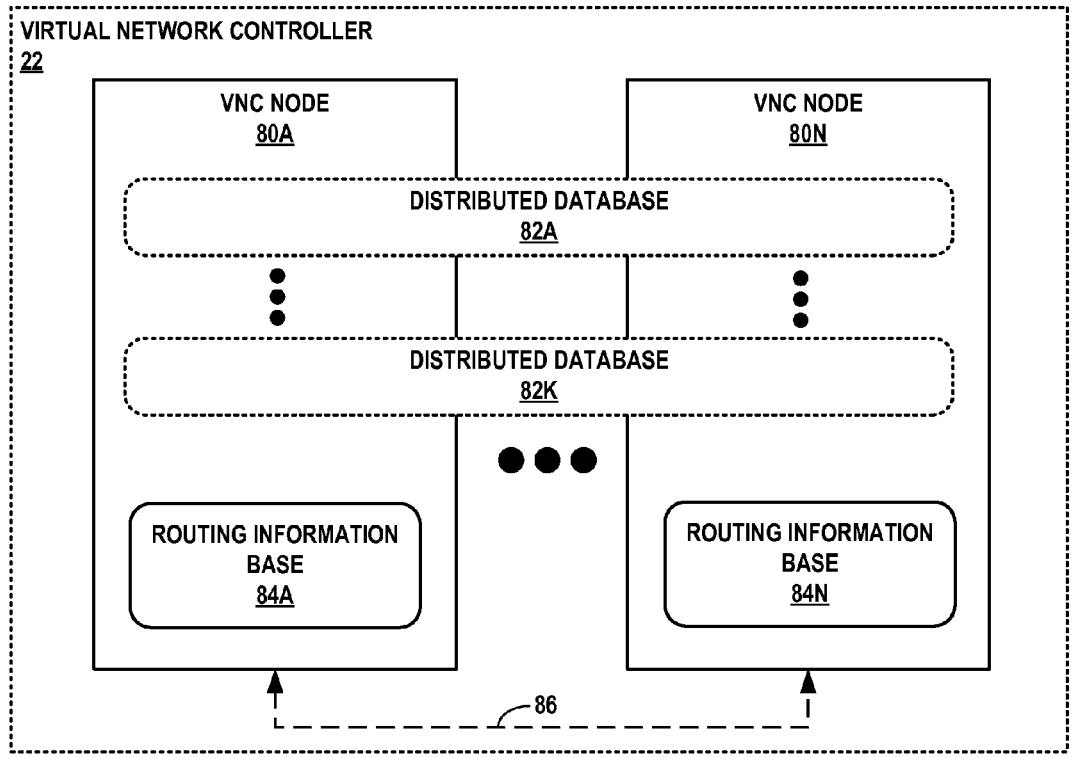
FIG. 4 is a block diagram illustrating an example implementation of a virtual network controller to determine a physical network path in a virtualized network domain in accordance with one or more embodiments of this disclosure.

FIG. 4 is a block diagram illustrating an example implementation of a virtual network controller 22 for facilitating operation of one or more virtual networks in accordance with one or more embodiments of this disclosure. Virtual network controller 22 may, for example, correspond to virtual network controller 22 of data center 10 of FIGS. 1 and 2.

Virtual network controller (VNC) 22 of FIG. 4 illustrates a distributed implementation of a VNC that includes multiple VNC nodes 80A-80N (collectively, "VNC nodes 80") to execute the functionality of a data center VNC, including managing the operation of virtual switches for one or more virtual networks implemented within the data center. Each of VNC nodes 80 may represent a different server of the data center, e.g., any of servers 12 of FIGS. 1-2, or alternatively, on a server or controller coupled to the IP fabric by, e.g., an edge router of a service provider network or a customer edge device of the data center network. In some instances, some of VNC nodes 80 may execute as separate virtual machines on the same server.

Each of VNC nodes 80 may control a different, non-overlapping set of data center elements, such as servers, individual virtual switches executing within servers, individual interfaces associated with virtual switches, chassis switches, TOR switches, and/or communication links. VNC nodes 80 peer with one another using peering links 86 to exchange information for distributed databases, including distributed databases 82A-82K (collectively, "distributed databases 82"), and routing information (e.g., routes) for routing information bases 84A-84N (collectively, "RIBs 84"). Peering links 86 may represent peering links for a routing protocol, such as a Border Gateway Protocol (BGP) implementation, or another peering protocol by which VNC nodes 80 may coordinate to share information according to a peering relationship.

VNC nodes 80 of VNC 22 include respective RIBs 84 each having, e.g., one or more routing tables that store routing information for the physical network and/or one or more overlay networks of the data center controlled by VNC 22. In some instances, one of RIBs 84, e.g., RIB 84A, may store the complete routing table for any of the virtual networks operating within the data center and controlled by the corresponding VNC node 80 (e.g., VNC node 80A).

In general, distributed databases 82 define the configuration or describe the operation of virtual networks by the data center controlled by distributed VNC 22. For instance, distributes databases 82 may include databases that describe a configuration of one or more virtual networks, the hardware/software configurations and capabilities of data center servers, performance or diagnostic information for one or more virtual networks and/or the underlying physical network, the topology of the underlying physical network including server/chassis switch/TOR switch interfaces and interconnecting links, and so on. Distributed databases 82 may each be implemented using, e.g., a distributed hash table (DHT) to provide a lookup service for key/value pairs of the distributed database stored by different VNC nodes 80. VNC nodes 80 may request the servers 12 return a physical path through a virtual network for a network flow. VNC nodes 80 may then store the physical path to one of distributed databases 82 In some instances, any of VNC nodes 80 may determine a physical path through virtual network for a network flow using techniques described herein as being performed by a server 12.

Figure 5:
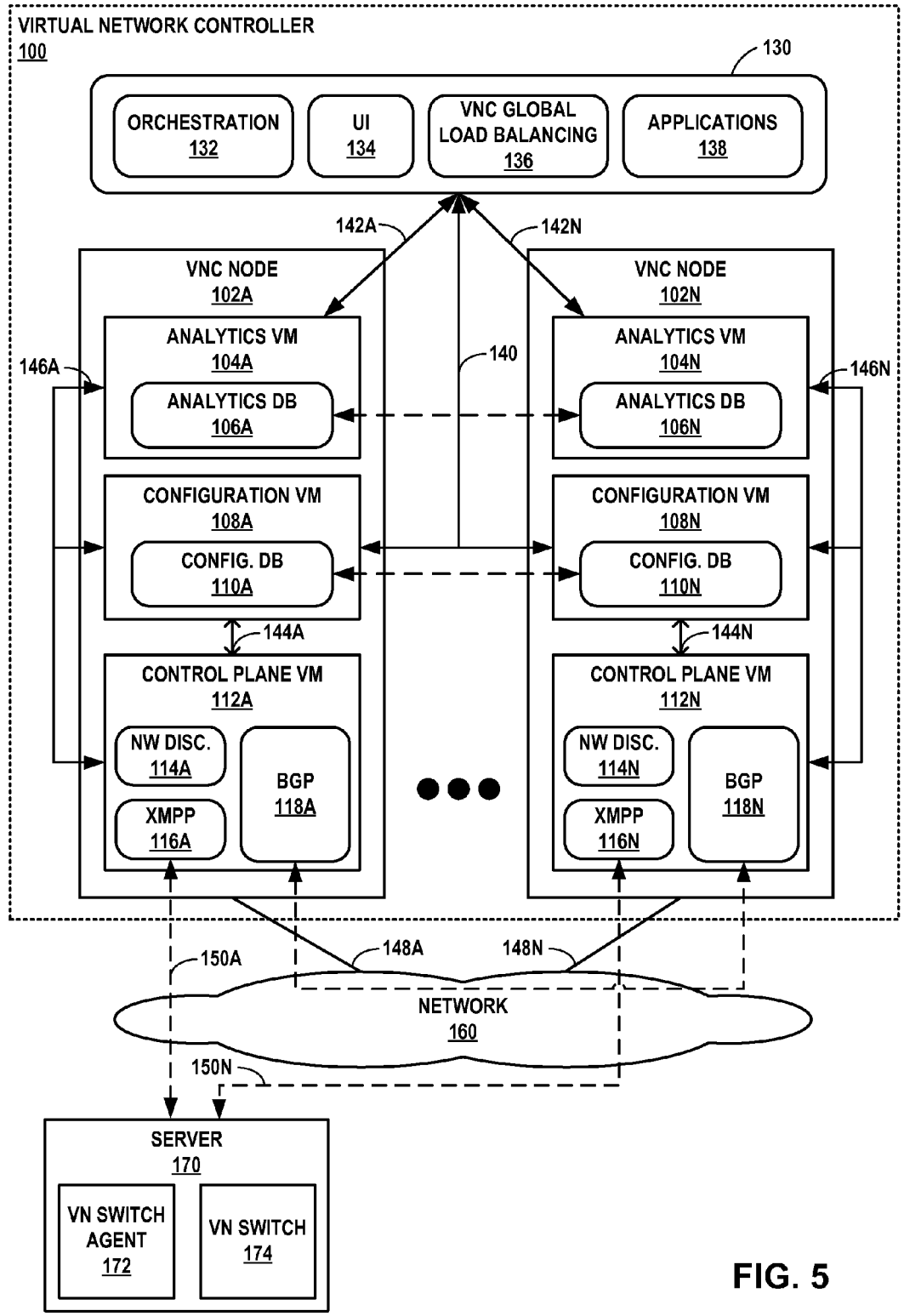
FIG. 5 is a block diagram illustrating an example implementation of a virtual network controller to determine a physical network path in a virtualized network domain in accordance with one or more embodiments of this disclosure.

FIG. 5 is a block diagram illustrating an example implementation of a virtual network controller 100 for facilitating operation of one or more virtual networks in accordance with one or more embodiments of this disclosure. Virtual network controller 100 may, for example, correspond to virtual network controller 22 of data center 10 of FIGS. 1 and 2 or virtual network controller 22 of FIG. 4.

As illustrated in the example of FIG. 5, distributed virtual network controller (VNC) 100 includes one or more virtual network controller ("VNC") nodes 102A-102N (collectively, "VNC nodes 102"). Each of VNC nodes 102 may represent any of VNC nodes 80 of virtual network controller 22 of FIG. 4. VNC nodes 102 that peer with one another according to a peering protocol operating over network 160. Network 160 may represent an example instance of switch fabric 14 and/or IP fabric 20 of FIG. 1. In the illustrated example, VNC nodes 102 peer with one another using a Border Gateway Protocol (BGP) implementation, an example of a peering protocol. VNC nodes 102 provide, to one another using the peering protocol, information related to respective elements of the virtual network managed, at least in part, by the VNC nodes 102. For example, VNC node 102A may manage a first set of one or more servers operating as virtual network switches for the virtual network. VNC node 102A may send information relating to the management or operation of the first set of servers to VNC node 102N by BGP 118A. Other elements managed by VNC nodes 102 may include network controllers and/or appliances, network infrastructure devices (e.g., L2 or L3 switches), communication links, firewalls, and VNC nodes 102, for example. Because VNC nodes 102 have a peer relationship, rather than a master-slave relationship, information may be sufficiently easily shared between the VNC nodes 102. In addition, hardware and/or software of VNC nodes 102 may be sufficiently easily replaced, providing satisfactory resource fungibility.

Each of VNC nodes 102 may include substantially similar components for performing substantially similar functionality, said functionality being described hereinafter primarily with respect to VNC node 102A. VNC node 102A may include an analytics database 106A for storing diagnostic information related to a first set of elements managed by VNC node 102A. VNC node 102A may share at least some diagnostic information related to one or more of the first set of elements managed by VNC node 102A and stored in analytics database 106, as well as to receive at least some diagnostic information related to any of the elements managed by others of VNC nodes 102. Analytics database 106A may represent a distributed hash table (DHT), for instance, or any suitable data structure for storing diagnostic information for network elements in a distributed manner in cooperation with others of VNC nodes 102. Analytics databases 106A-106N (collectively, "analytics databases 106") may represent, at least in part, one of distributed databases 82 of distributed virtual network controller 22 of FIG. 4.

VNC node 102A may include a configuration database 110A for storing configuration information related to a first set of elements managed by VNC node 102A. Control plane components of VNC node 102A may store configuration information to configuration database 110A using interface 144A, which may represent an Interface for Metadata Access Points (IF-MAP) protocol implementation. VNC node 102A may share at least some configuration information related to one or more of the first set of elements managed by VNC node 102A and stored in configuration database 110A, as well as to receive at least some configuration information related to any of the elements managed by others of VNC nodes 102. Configuration database 110A may represent a distributed hash table (DHT), for instance, or any suitable data structure for storing configuration information for network elements in a distributed manner in cooperation with others of VNC nodes 102. Configuration databases 110A-110N (collectively, "configuration databases 110") may represent, at least in part, one of distributed databases 82 of distributed virtual network controller 22 of FIG. 4.

Virtual network controller 100 may perform any one or more of the illustrated virtual network controller operations represented by modules 130, which may include orchestration 132, user interface 134, VNC global load balancing 136, and one or more applications 138. VNC 100 executes orchestration module 132 to facilitate the operation of one or more virtual networks in response to a dynamic demand environment by, e.g., spawning/removing virtual machines in data center servers, adjusting computing capabilities, allocating network storage resources, and modifying a virtual topology connecting virtual switches of a virtual network. VNC global load balancing 136 executed by VNC 100 supports load balancing of analytics, configuration, communication tasks, e.g., among VNC nodes 102. Applications 138 may represent one or more network applications executed by VNC nodes 102 to, e.g., change topology of physical and/or virtual networks, add services, or affect packet forwarding.

User interface 134 includes an interface usable to an administrator (or software agent) to control the operation of VNC nodes 102. For instance, user interface 134 may include methods by which an administrator may modify, e.g. configuration database 110A of VNC node 102A. Administration of the one or more virtual networks operated by VNC 100 may proceed by uniform user interface 134 that provides a single point of administration, which may reduce an administration cost of the one or more virtual networks.

VNC node 102A may include a control plane virtual machine (VM) 112A that executes control plane protocols to facilitate the distributed VNC techniques described herein. Control plane VM 112A may in some instances represent a native process. In the illustrated example, control VM 112A executes BGP 118A to provide information related to the first set of elements managed by VNC node 102A to, e.g., control plane virtual machine 112N of VNC node 102N. Control plane VM 112A may use an open standards based protocol (e.g., BGP based L3VPN) to distribute information about its virtual network(s) with other control plane instances and/or other third party networking equipment(s). Given the peering based model according to one or more aspects described herein, different control plane instances (e.g., different instances of control plane VMs 112A-112N) may execute different software versions. In one or more aspects, e.g., control plane VM 112A may include a type of software of a particular version, and the control plane VM 112N may include a different version of the same type of software. The peering configuration of the control node devices may enable use of different software versions for the control plane VMs 112A-112N. The execution of multiple control plane VMs by respective VNC nodes 102 may prevent the emergence of a single point of failure.

Control plane VM 112A communicates with virtual network switches, e.g., illustrated VM switch 174 executed by server 140, using a communication protocol operating over network 160. Virtual network switches facilitate overlay networks in the one or more virtual networks. In the illustrated example, control plane VM 112A uses Extensible Messaging and Presence Protocol (XMPP) 116A to communicate with at least virtual network switch 174 by XMPP interface 150A. Virtual network route data, statistics collection, logs, and configuration information may in accordance with XMPP 116A be sent as XML documents for communication between control plane VM 112A and the virtual network switches. Control plane VM 112A may in turn route data to other XMPP servers (such as an analytics collector) or may retrieve configuration information on behalf of one or more virtual network switches. Control plane VM 112A may further execute a communication interface 144A for communicating with configuration virtual machine (VM) 108A associated with configuration database 110A. Communication interface 144A may represent an IF-MAP interface.

VNC node 102A may further include configuration VM 108A to store configuration information for the first set of element to and manage configuration database 110A. Configuration VM 108A, although described as a virtual machine, may in some aspects represent a native process executing on an operating system of VNC node 102A. Configuration VM 108A and control plane VM 112A may communicate using IF-MAP by communication interface 144A and using XMPP by communication interface 146A. In some aspects, configuration VM 108A may include a horizontally scalable multi-tenant IF-MAP server and a distributed hash table (DHT)-based IF-MAP database that represents configuration database 110A. In some aspects, configuration VM 108A may include a configuration translator, which may translate a user friendly higher-level virtual network configuration to a standards based protocol configuration (e.g., a BGP L3VPN configuration), which may be stored using configuration database 110A. Communication interface 140 may include an IF-MAP interface for communicating with other network elements. The use of the IF-MAP may make the storage and management of virtual network configurations very flexible and extensible given that the IF-MAP schema can be dynamically updated. Advantageously, aspects of virtual network controller 100 may be flexible for new applications 138.

VNC node 102A may further include an analytics virtual machine (VM) 104A to store diagnostic information (and/or visibility information) related to at least the first set of elements managed by VNC node 102A. Control plane VM and analytics VM 104 may communicate using an XMPP implementation by communication interface 146A. Analytics VM 104A, although described as a virtual machine, may in some aspects represent a native process executing on an operating system of VNC node 102A.

Analytics VM 104A may include analytics database 106A, which may represent an instance of a distributed database that stores visibility data for virtual networks, such as one of distributed database 82 of distributed virtual network controller 22 of FIG. 4. Visibility information may describe visibility of both distributed VNC 100 itself and of customer networks. The distributed database may include an XMPP interface on a first side and a REST/JASON/XMPP interface on a second side.

Virtual network switch 174 may implement the layer 3 forwarding and policy enforcement point for one or more end points and/or one or more hosts. The one or more end points or one and/or one or more hosts may be classified into a virtual network due to configuration from control plane VM 112A. Control plane VM 112A may also distribute virtual-to-physical mapping for each end point to all other end points as routes. These routes may give the next hop mapping virtual IP to physical IP and encapsulation technique used (e.g., one of IPinIP, NVGRE, VXLAN, etc.). Virtual network switch 174 may be agnostic to actual tunneling encapsulation used. Virtual network switch 174 may also trap interesting layer 2 (L2) packets, broadcast packets, and/or implement proxy for the packets, e.g. using one of Address Resolution Protocol (ARP), Dynamic Host Configuration Protocol (DHCP), Domain Name Service (DNS), etc.

In some cases, different VNC nodes 102 may be provided by different suppliers. However, the peering configuration of VNC nodes 102 may enable use of different hardware and/or software provided by different suppliers for implementing the VNC nodes 102 of distributed VNC 100. A system operating according to the techniques described above may provide logical view of network topology to end-host irrespective of physical network topology, access type, and/or location. Distributed VNC 100 provides programmatic ways for network operators and/or applications to change topology, to affect packet forwarding, and/or to add services, as well as horizontal scaling of network services, e.g. firewall, without changing the end-host view of the network.

Control plane VMs 112 may request the servers 12 return a physical path through a virtual network for a network flow. Upon control plane VMs 112 receiving a physical path, corresponding analytics VMs 104 may store the physical path to corresponding analytics databases 106. In some instances, any of VNC nodes 102 may determine a physical path through virtual network for a network flow using techniques described herein as being performed by a server 12.

Figure 6:
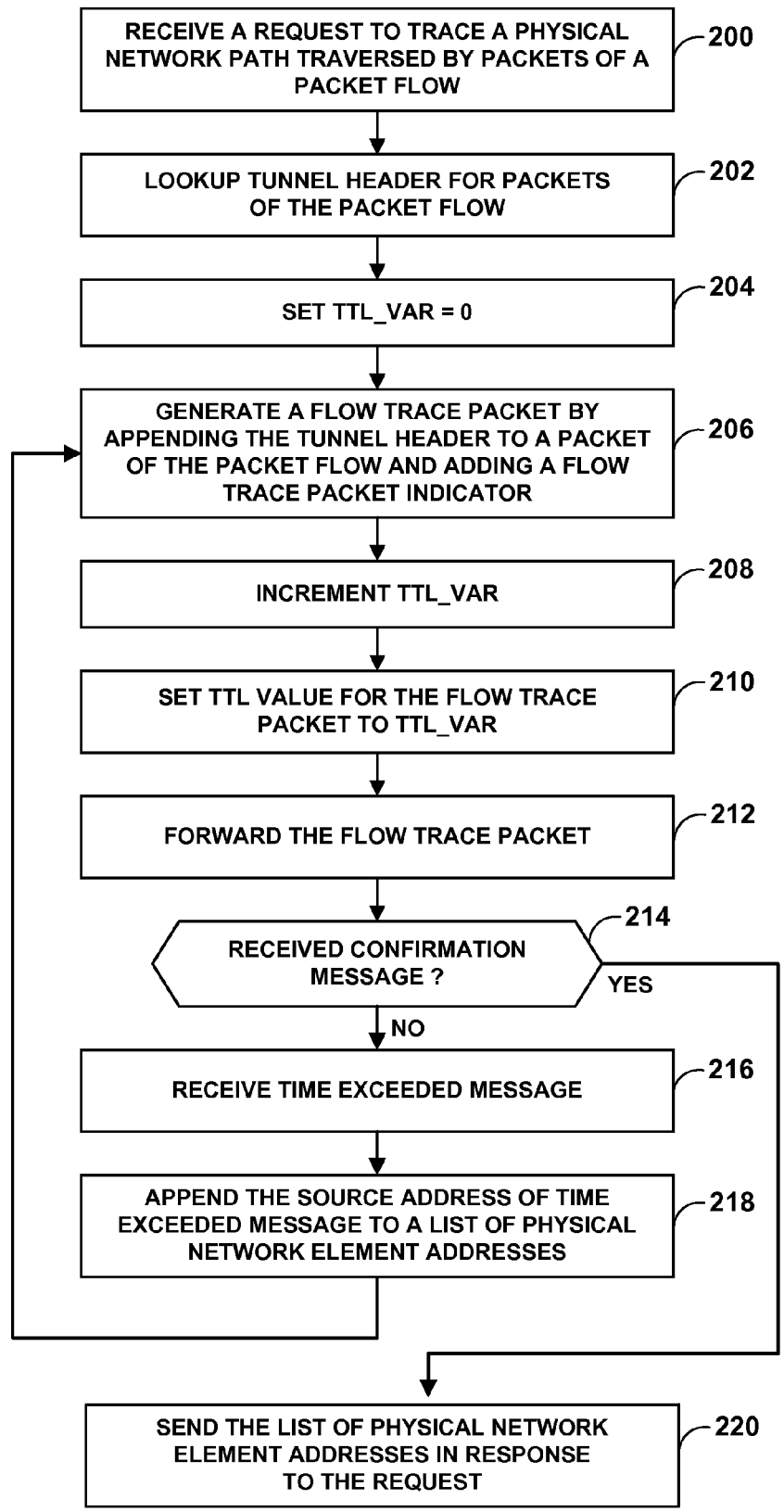
FIG. 6 is a flowchart illustrating an example mode of operation of a network element to determine a physical network path in a virtualized network domain in accordance with techniques described in this disclosure.

FIG. 6 is a flowchart illustrating an example mode of operation of a network element to determine a physical network path in a virtualized network domain in accordance with techniques described in this disclosure. This mode of operation is described with respect to components of server 12A of FIG. 2 but may be performed by other network elements of data center 10, such as TORs 16 or chassis switches 18.

Initially, flow trace module (FTM) 48 of server 12A receives a request to determine, or "trace," a physical network path traversed by packets of a packet flow (100). The request may include, e.g., a complete IP packet that conforms to the packet flow, an IP header that matches IP headers of packets of the packet flow, or one or more fields for such an IP header (a source IP address and destination IP address for example). The packet flow may represent a packet flow that traverses an overlay/virtual network. In some examples, VN agent 35A receives the request from VNC 22 and sends the request to FTM 48. FTM 48 may use a destination IP address for the packet flow to query a network forwarding table 32 corresponding to the virtual network of the packet flow, such as $NFT_1$, to obtain a tunnel header and in some cases other tunneling information, such as an outbound interface, for packets of the packet flow (202). To initialize the flow trace, FTM 48 sets a variable, TTL_VAR, to 0 (204).

Flow trace module 48 generates an outer, flow trace packet for the virtual network by generating an inner packet that includes trace packet information, such as a trace packet identifier and sequence number, and appending the obtained tunnel header to the inner packet and adding a flow trace packet indicator to a field of the outer packet (206). For subsequently generated flow trace packets for this request, FTM 48 may increment the sequence number. The flow trace packet indicator is described in further detail with respect to FIGS. 8-9. The inner packet of the flow trace packet is a data payload of the flow trace packet.

Flow trace module 48 increments TTL_VAR (208) and sets the TTL field of the flow trace packet to TTL_VAR (210). For the initial flow trace packet, this means the TTL field has a value of 1. Switch 30A forwards the flow trace packet module by the outbound interface according to the network forwarding table corresponding to the virtual network of the packet flow (212).

If switch 30A does not receive a confirmation message (NO branch of 214) and instead receives a time exceeded message (e.g., an ICMP Time Exceeded message) responsive to the latest flow trace packet for the request (216), FTM 48 appends the source address of the time exceeded message to a list of physical network element network addresses (218). The source address is an address of the physical network element that sent the time exceeded message. Flow trace module 48 then performs again at least steps 106-112 to generate and forward another flow trace packet with an incremented value for the TTL field. In this way, flow trace module 48 generates one or more flow trace packets having incrementally increasing respective time-to-live values.

If switch 30A receives a confirmation message (YES branch of 214) responsive to a flow trace packet, such as an ICMP Echo Reply, this indicates that a tunnel endpoint for the virtual network has received the flow trace packet and that the physical network path has been fully traced. FPM module 48 therefore replies to the request by sending the list of physical network element network addresses to the requesting device. In some examples, VM agent 35A sends the list to VNC 22.

Figure 7:
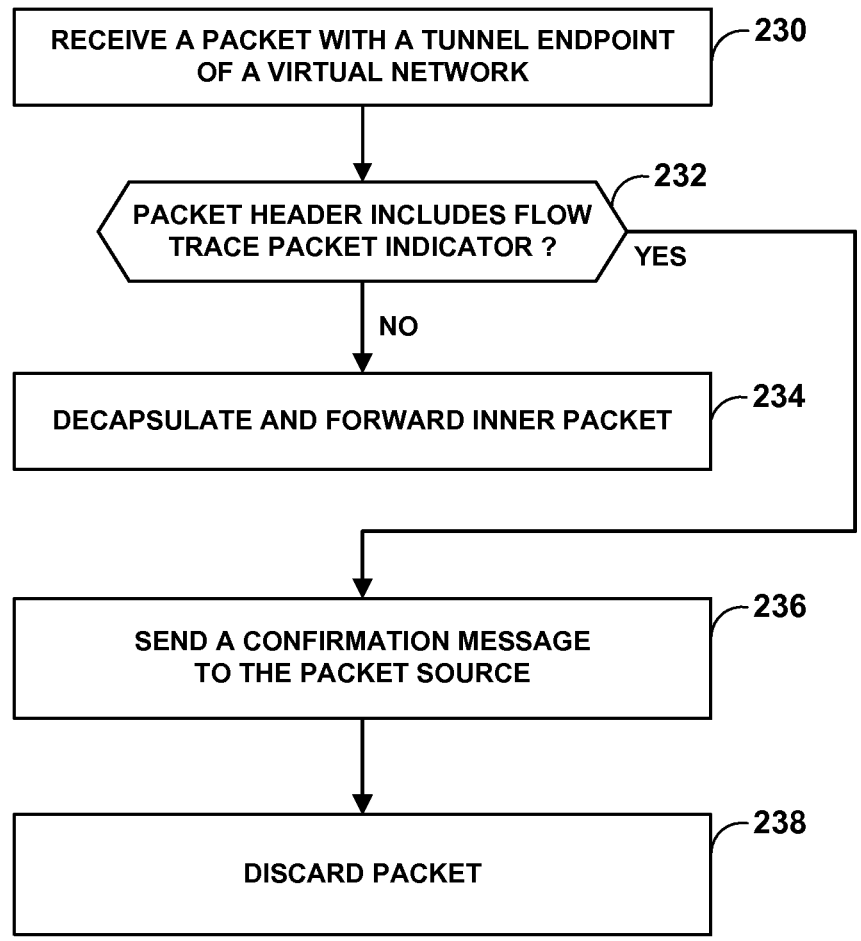
FIG. 7 is a flowchart illustrating an example mode of operation of a network element according to techniques of this disclosure.

FIG. 7 is a flowchart illustrating an example mode of operation of a network element according to techniques of this disclosure. This mode of operation is described with respect to components of server 12A of FIG. 2 but may be performed by other network elements of data center 10, such as TORs 16 or chassis switches 18.

Switch 30A of server 12A is a tunnel endpoint for a virtual network, such as the virtual network associated with network forwarding table 32 NFT₁, and receives a packet by a tunnel of the virtual network (230). The packet is an outer packet that includes a tunnel header and may represent one of the packets described with respect FIGS. 8-9. If the tunnel header does not include a flow trace packet indicator (NO branch of 232), then switch 30A decapsulates the inner packet of the tunnel header and forwards the inner packet to one of VMs 32 that has a network address that is a destination network address of the inner packet (234). If, however, the tunnel includes a flow trace packet indicator (YES branch of 232), the packet is a flow trace packet and switch 30A sends a confirmation message to another of servers 12 having a network address that is a source network address of the tunnel header to confirm receipt at server 12A (236). The confirmation message may transport at least a portion of the inner packet, including the IP header of the inner packet in some cases. The confirmation message may be, e.g., an ICMP Echo Reply message. Because the flow trace packet received by server 12A does not carry application data for any of VMs 32, switch 30A discards the flow trace packet.

Figure 8:
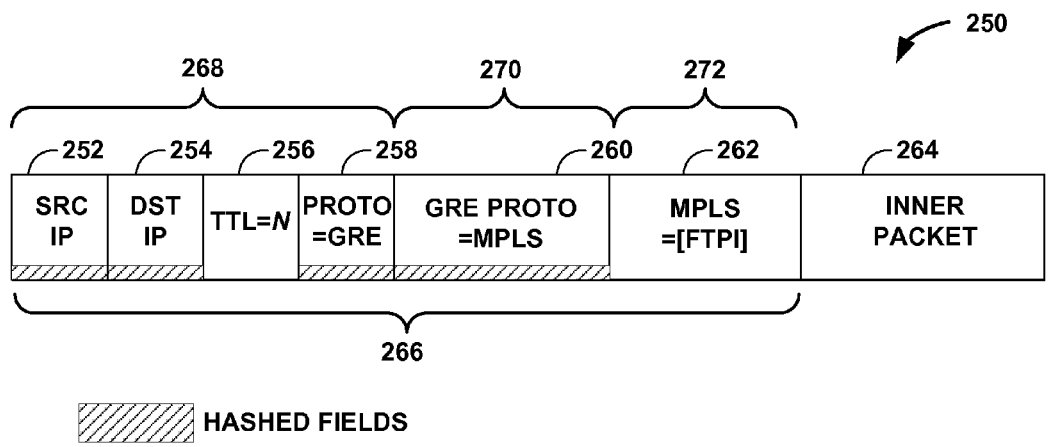
FIG. 8 is a block diagram illustrating fields of an example flow trace packet generated according to techniques described herein.

FIG. 8 is a block diagram illustrating fields of an example flow trace packet generated according to techniques described herein. MPLS-in-GRE packet 250 is a flow trace packet generated for a virtual network implemented according to MPLS-in-GRE encapsulation techniques, which encapsulates a Multiprotocol Label Switching (MPLS) packet in Generic Route Encapsulation (GRE) for a GRE tunnel. For simplicity and ease of illustration, MPLS-in-GRE packet 250 does not illustrate each and every field of a typical MPLS-in-GRE packet but is offered to highlight the techniques described herein.

A MPLS-in-GRE tunnel endpoint generates MPLS-in-GRE packet 250 to include tunnel header 266, which includes an outer IP header 268 composed of source IP address 252 ("SRC IP 252"), destination IP address 254 ("DST IP 254"), Time-to-Live field 256 having a value incrementally set according to techniques described above with respect to, e.g., FIG. 6, and IP protocol field 258 ("PROTO 258") that defines the protocol used in the data portion of the IP datagram (here, GRE); a GRE tunnel header 270 composed of GRE protocol field 260 ("GRE PROTO 260") that identifies the protocol used in the data portion of the GRE datagram (here, MPLS); and an MPLS label stack 272 that includes MPLS label 262 ("MPLS 262"). MPLS label 262 is an MPLS label value used to designate the individual MPLS-in-GRE overlay network on which communication VMs are situated. MPLS-in-GRE packet 250 also includes an inner packet 264, which may include flow trace information about MPLS-in-GRE packet 250 such as an identifier and/or sequence number.

In some cases, the tunnel endpoint may allocate a packet flow to any one of a plurality of equal-cost multipaths to reach a packet flow destination. The tunnel endpoint may apply a hashing function to one or more of the header fields of a packet for a packet flow, and the output of the hashing function determines the path in the equal-cost multipath that is selected for the packet flow. In the example MPLS-in-GRE packet 250, the tunnel endpoint applies a hashing function to SRC IP 252, DST IP 254, IP protocol field 258, and GRE protocol field 260. However, the tunnel endpoint does not apply the hashing function to MPLS label 262. As a result, MPLS-in-GRE packet 250 may be hashed to the path of the equal-cost multipath that is the same path as that selected for the packet flow whose physical network path is being traced. In other words, for a packet flow being traced, the tunnel endpoint generates MPLS-in-GRE packet 250 to include hashed fields identical to packets of the packet. Other fields may vary. Because ICMP is identified differently in other instances of IP protocol field 258 for, e.g., ICMP Echo Requests and because IP protocol field 258 is a hash field, ICMP packets will necessarily be hashed by a tunnel endpoint differently that MPLS-in-GRE packet 250 and may result in ICMP Echo Request being transported on a different path in an equal-cost multipath proceeding from the tunnel endpoint.

Accordingly, to identify MPLS-in-GRE packet 250 as a flow trace packet, MPLS-in-GRE packet 250 includes a flow trace packet indicator in the form of a flow trace packet indicator value for MPLS label 262. The flow trace packet indicator value, like MPLS label 262, may be a 20-bit value that is a specially-designated value to identify a packet as a flow trace packet rather than to designate an individual MPLS-in-GRE-based overlay network. Because a tunnel endpoint does not hash MPLS label 262 in a hashing function, MPLS-in-GRE packet 250 may follow the same physical network path as a packet of the packet flow being traced.

Figure 9:
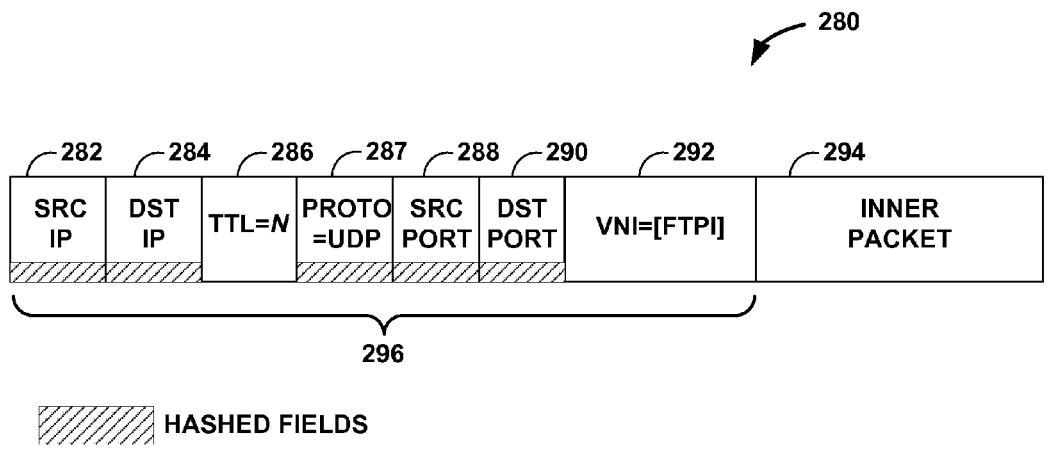
FIG. 9 is a block diagram illustrating fields of an example flow trace packet generated according to techniques described herein.

FIG. 9 is a block diagram illustrating fields of an example flow trace packet generated according to techniques described herein. Virtual eXtensible Local Area Network (VxLAN) packet 280 is a flow trace packet generated for a virtual network implemented according to VxLAN techniques. For simplicity and ease of illustration, VxLAN packet 280 does not illustrate each and every field of a typical VxLAN packet but is offered to highlight the techniques described herein.

A VxLAN Tunnel End Point is a tunnel endpoint that generates VxLAN packet 280 to include tunnel header 296, which includes an outer IP header composed of source IP address 282 ("SRC IP 282"), destination IP address 284 ("DST IP 284"), Time-to-Live field 286 having a value for multiple instances of VxLAN packet 280 incrementally increasing according to techniques described above with respect to, e.g., FIG. 6, and IP protocol field 287 that defines the protocol used in the data portion of the IP datagram (here, UDP); an outer UDP header composed of source UDP port 288 ("SRC PORT 288") and destination UDP port 290 ("DST PORT 290"); and a VxLAN header that includes VxLAN network identifier (VNI) 292 ("VNI 292") (alternatively referred to as a VxLAN segment identifier). VNI 292 is a 24 bit value used to designate the individual VxLAN overlay network on which communication VMs are situated. VxLAN packet 280 also includes an inner packet 294, which may include flow trace information about VxLAN packet 280 such as an identifier and/or sequence number.

In some cases, the tunnel endpoint may allocate a packet flow to any one of a plurality of equal-cost multipaths to reach a packet flow destination. The tunnel endpoint may apply a hashing function to one or more of the header fields of a packet for a packet flow, and the output of the hashing function determines the path in the equal-cost multipath that is selected for the packet flow. In the example VxLAN packet 280, the tunnel endpoint applies a hashing function to SRC IP 282, DST IP 284, IP protocol field 287, SRC PORT 288, and DST PORT 290. However, the tunnel endpoint does not apply the hashing function to VNI 292. As a result, VxLAN packet 280 may be hashed to the path of the equal-cost multipath that is the same path as that selected for the packet flow whose physical network path is being traced. In other words, for a packet flow being traced, the tunnel endpoint generates VxLAN packet 280 to include hashed fields identical to packets of the packet. Other fields may vary. Because ICMP is identified differently in other instances of IP protocol field 287 for, e.g., ICMP Echo Requests and because IP protocol field 287 is a hash field, ICMP packets will necessarily be hashed by a tunnel endpoint differently that VxLAN packet 280 and may result in ICMP Echo Request being transported on a different path in an equal-cost multipath proceeding from the tunnel endpoint.

Accordingly, to identify VxLAN packet 280 as a flow trace packet, VxLAN packet 280 includes a flow trace packet indicator in the form of a flow trace packet indicator value for VNI 292. The flow trace packet indicator value, like VNI 292, may be a 24-bit value that is a specially-designated value to identify a packet as a flow trace packet rather than to designate an individual VxLAN overlay network. Because a tunnel endpoint does not hash VNI 292 in a hashing function, VxLAN packet 280 may follow the same physical network path as a packet of the packet flow being traced. Although described above with respect to MPLS-in-GRE- and VxLAN-based network virtualization, the techniques of this disclosure may applicable to other network virtualization encapsulation types, including MPLS-in-IP, Network Virtualization using Generic Routing Encapsulation (NVGRE), and others.

Figure 10:
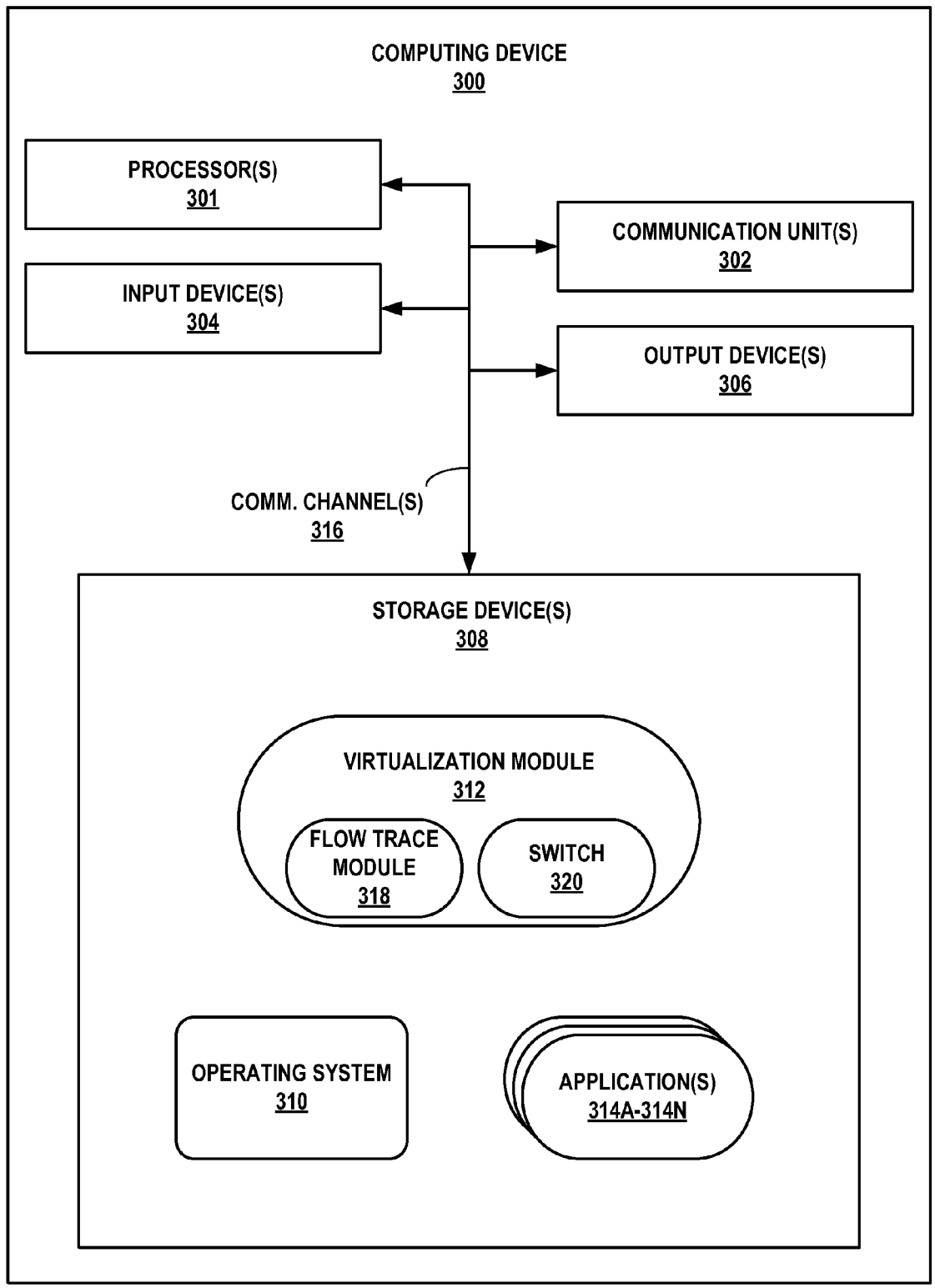
FIG. 10 is a block diagram illustrating an example computing device for determining a physical network path in a virtualized network domain, in accordance with one or more aspects of the present disclosure.

FIG. 10 is a block diagram illustrating an example computing device for determining a physical network path in a virtualized network domain, in accordance with one or more aspects of the present disclosure. Computing device 300 may represent, e.g., any of servers 12, TORs 16, or chassis switches 18 of FIG. 1. FIG. 10 illustrates only one particular example of computing device 300, and many other examples of computing device 300 may be used in other instances. For example, a computing device that implements TORs 16 and chassis switches 18 may include a high-speed distributed forwarding plane.

As shown in the specific example of FIG. 10, computing device 300 includes one or more processors 301, one or more communication units 302, one or more input devices 304, one or more output devices 306, and one or more storage devices 308. Computing device 300 further includes operating system 310, virtualization module 312, and one or more applications 314A-314N (collectively "applications 314"). Virtualization module 312 may represent hypervisor 31 of server 12A, for instance, and applications 314 may represent different VMs 36. Each of components 301, 302, 304, 306, and 308 may be interconnected (physically, communicatively, and/or operatively) for inter-component communications. As one example in FIG. 10, components 301, 302, 304, 306, and 308 may be coupled by one or more communication channels 316. In some examples, communication channels 316 may include a system bus, network connection, interprocess communication data structure, or any other channel for communicating data. Virtualization module 312 and applications 314, as well as operating system 310 may also communicate information with one another as well as with other components in computing device 300. Virtualization module 312 includes software switch 320 to switch packets on one or more virtual networks. Virtualization module 312 also includes flow trace module 318 to determine physical network paths of network flows switched by computing device 300 by generating flow trace packets and incrementally setting respective TTL values to cause downstream switching device to return time exceeded messages to computing device. Flow trace module 318 may represent an example instance of FTM 48 of FIG. 1.

Processors 301, in one example, are configured to implement functionality and/or process instructions for execution within computing device 300. For example, processors 301 may be capable of processing instructions stored in storage devices 308. Examples of processors 301 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 308 may be configured to store information within computing device 300 during operation. Storage devices 308, in some examples, are described as a computer-readable storage medium. In some examples, storage devices 308 are a temporary memory, meaning that a primary purpose of storage devices 308 is not long-term storage. Storage devices 308, in some examples, are described as a volatile memory, meaning that storage devices 308 do not maintain stored contents when the computer is turned off. Examples of volatile memories include random access memories (RAM), dynamic random access memories (DRAM), static random access memories (SRAM), and other forms of volatile memories known in the art. In some examples, storage devices 308 are used to store program instructions for execution by processors 301. Storage devices 308, in one example, are used by software or applications running on computing device 300 (e.g., operating system 310, virtualization module 312 and the like) to temporarily store information during program execution.

Storage devices 308, in some examples, also include one or more computer-readable storage media. Storage devices 308 may be configured to store larger amounts of information than volatile memory. Storage devices 308 may further be configured for long-term storage of information. In some examples, storage devices 308 include non-volatile storage elements. Examples of such non-volatile storage elements include magnetic hard discs, tape cartridges or cassettes, optical discs, floppy discs, flash memories, or forms of electrically programmable memories (EPROM) or electrically erasable and programmable memories (EEPROM).

Computing device 300, in some examples, also includes one or more communication units 302. Computing device 300, in one example, utilizes communication units 302 to communicate with external devices. Communication units 302 may communicate, in some examples, by sending data packets over one or more networks, such as one or more wireless networks, via inbound and outbound links. Communication units 302 may include one or more network interface cards (IFCs), such as an Ethernet card, an optical transceiver, a radio frequency transceiver, or any other type of device that can send and receive information. Other examples of such network interfaces may include Bluetooth, 3G and Wi-Fi radio components. In some examples, computing device 300 utilizes communication units 302 to exchange tunneled packets with other computing devices in a virtualized network domain of a data center.

Computing device 300, in one example, also includes one or more input devices 304. Input devices 304, in some examples, are configured to receive input from a user through tactile, audio, or video feedback. Examples of input devices 304 include a presence-sensitive display, a mouse, a keyboard, a voice responsive system, video camera, microphone or any other type of device for detecting a command from a user. In some examples, a presence-sensitive display includes a touch-sensitive screen.

One or more output devices 306 may also be included in computing device 300. Output devices 306, in some examples, are configured to provide output to a user using tactile, audio, or video stimuli. Output devices 306, in one example, include a presence-sensitive display, a sound card, a video graphics adapter card, or any other type of device for converting a signal into an appropriate form understandable to humans or machines. Additional examples of output devices 306 include a speaker, a cathode ray tube (CRT) monitor, a liquid crystal display (LCD), or any other type of device that can generate intelligible output to a user.

Computing device 300 may include operating system 312. Operating system 312, in some examples, controls the operation of components of computing device 300. For example, operating system 312, in one example, facilitates the communication of modules applications 314 with processors 301, communication units 302, input devices 304, output devices 306, and storage devices 310. Applications 314 may each include program instructions and/or data that are executable by computing device 300. As one example, application 314A may include instructions that cause computing device 300 to perform one or more of the operations and actions described in the present disclosure.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method for determining a physical network path of a packet flow comprising:
   generating, with a network device, one or more flow trace packets having incrementally increasing respective time-to-live (TTL) values, wherein each flow trace packet of the flow trace packets includes a tunnel header that includes a flow trace packet indicator that indicates the flow trace packet should be discarded by a tunnel endpoint that receives the flow trace packet;
   sending, with the network device, the flow trace packets on an outbound interface of the network device for the physical network path; and
   receiving, with the network device, corresponding time exceeded messages for the flow trace packets, wherein each of the time exceeded messages includes a source network address of a network element on the physical network path.

2. The method of claim 1, wherein the tunnel header further includes an Internet Protocol (IP) field value that is equivalent to an IP field value of a tunnel header for a packet of the packet flow.

3. The method of claim 1, further comprising:
   receiving, with the network device, a packet;
   determining whether the packet is a flow trace packet;
   upon determining the packet is a flow trace packet, sending a confirmation message to a network address that is a source network address of the flow trace packet, wherein the confirmation message indicates that the network device is a tunnel endpoint for the packet and that the network device received the packet.

4. The method of claim 3, further comprising:
   by a second network device and in response to receiving the flow trace packet and determining, based on the flow trace packet indicator, that the packet is a flow trace packet, discarding the packet.

5. The method of claim 4, wherein the flow trace packet indicator is one of a Multiprotocol Label Switching (MPLS) label value or Virtual eXtensible Local Area Network (VxLAN) network identity value that identifies a packet as a flow trace packet to be discarded by a tunnel endpoint that receives the flow trace packet.

6. The method of claim 5, wherein determining whether the packet is a flow trace packet comprises determining whether the packet includes a flow trace packet indicator.

7. The method of claim 1, further comprising:
   receiving, with the network device and from a requesting device, a request to determine the physical network path;
   generating a list of the source network addresses received in the time exceeded messages; and
   in response to the request, sending the list to the requesting device.

8. The method of claim 7,
   wherein the request includes a destination network address of the packet flow, and
   wherein generating the flow trace packets comprises determining the tunnel header using the destination network address and adding the tunnel header as an outer header of each of the flow trace packets.

9. The method of claim 1, further comprising:
receiving, with the network device, a confirmation message that is associated with the flow trace packets and that indicates that a tunnel endpoint for a tunnel that transports the packet flow received one of the flow trace packets; and
in response to receiving the confirmation message, refraining from generating additional flow trace packets for determining the physical network path of the packet flow.

10. The method of claim 9, wherein the confirmation message comprises an Internet Control Message Protocol (ICMP) Echo Reply message.

11. A network device comprising:
one or more processors;
a switch executed by the processors to forward packets of a packet flow to a physical network path; and
a flow trace module to generate one or more flow trace packets having incrementally increasing respective time-to-live (TTL) values, wherein each flow trace packet of the flow trace packets includes a tunnel header that includes a flow trace packet indicator that indicates the flow trace packet should be discarded by a tunnel endpoint that receives the flow trace packet,
wherein the switch module forwards the flow trace packets on an outbound interface of the network device for the physical network path, and
wherein the flow trace module receives corresponding time exceeded messages for the flow trace packets, wherein each of the time exceeded messages includes a source network address of a network element on the physical network path.

12. The network device of claim 11, wherein the tunnel header further includes an Internet Protocol (IP) field value that is equivalent to an IP field value of a tunnel header for a packet of the packet flow.

13. The network device of claim 11,
wherein the switch receives a packet,
wherein the switch determines whether the packet is a flow trace packet,
wherein the flow trace module, upon determining the packet is a flow trace packet, sends a confirmation message to network address that is a source network address of the flow trace packet, and
wherein the confirmation message indicates that the network device is a tunnel endpoint for the packet and that the network device received the packet.

14. The network device of claim 13, wherein the flow trace module discards flow trace packets received from other network devices upon determining, based on the flow trace packet indicators, that the packets are flow trace packets.

15. The network device of claim 14, wherein the flow trace packet indicator is one of a Multiprotocol Label Switching (MPLS) label value or Virtual eXtensible Local Area Network (VxLAN) network identity value that identifies a packet as a flow trace packet to be discarded by a tunnel endpoint that receives the flow trace packet.

16. The network device of claim 13, wherein determining whether the packet is a flow trace packet comprises determining whether the packet includes a flow trace packet indicator.

17. The network device of claim 11,
wherein the flow trace module receives, from a requesting device, a request to determine a physical network path, and
wherein the flow trace module generates a list of the source network addresses received in the time exceeded messages and, in response to the request, sends the list to the requesting device.

18. The network device of claim 17,
wherein the request includes a destination network address of the packet flow, and
wherein the flow trace module generates the flow trace packets by determining the tunnel header using the destination network address and adding the tunnel header as an outer header of each of the flow trace packets.

19. The network device of claim 11,
wherein the switch receives a confirmation message that is associated with the flow trace packets and that indicates a tunnel endpoint for a tunnel that transports the packet flow received one of the flow trace packets and
wherein the flow trace module, in response to the switch receiving the confirmation message, refrains from generating additional flow trace packets for determining the physical network path of the packet flow.

20. The network device of claim 19, wherein the confirmation message comprises an Internet Control Message Protocol (ICMP) Echo Reply message.

21. A non-transitory computer-readable medium comprising instructions for causing one or more programmable processors to:
generate, with a network device, one or more flow trace packets having incrementally increasing respective time-to-live (TTL) values, wherein each flow trace packet of the flow trace packets includes a tunnel header that includes a flow trace packet indicator that indicates the flow trace packet should be discarded by a tunnel endpoint that receives the flow trace packet;
send, with the network device, the flow trace packets on an outbound interface of the network device for the physical network path;
receive, with the network device, corresponding time exceeded messages for the flow trace packets, wherein each of the time exceeded messages includes a source network address of a network element on a physical network path; and
determine, with the network device, the physical network path using the source network addresses of the time exceeded messages.

* * * * *